Figure 1:
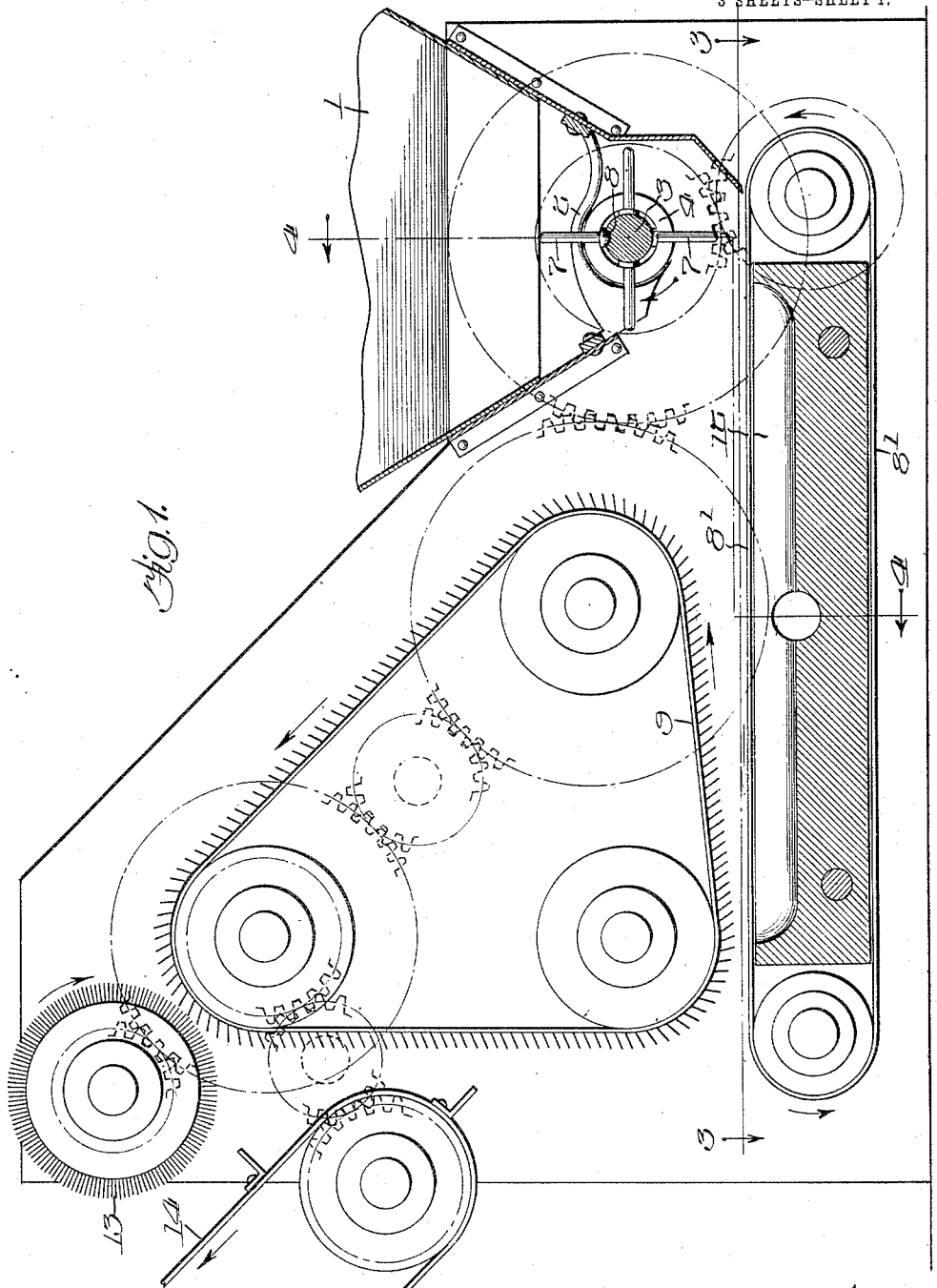

J. F. APPLEBY.
COTTON CLEANER.
APPLICATION FILED NOV. 17, 1911.

1,076,939.

Patented Oct. 28, 1913.

3 SHEETS—SHEET 1.

Witnesses:
Jno. H. Nelson Jr.
Edwin B. Nelson

Inventor:
John F. Appleby.
By G. L. Cross
Atty.

J. F. APPLEBY.
COTTON CLEANER.
APPLICATION FILED NOV. 17, 1911.
1,076,939.
Patented Oct. 28, 1913.
3 SHEETS—SHEET 2.
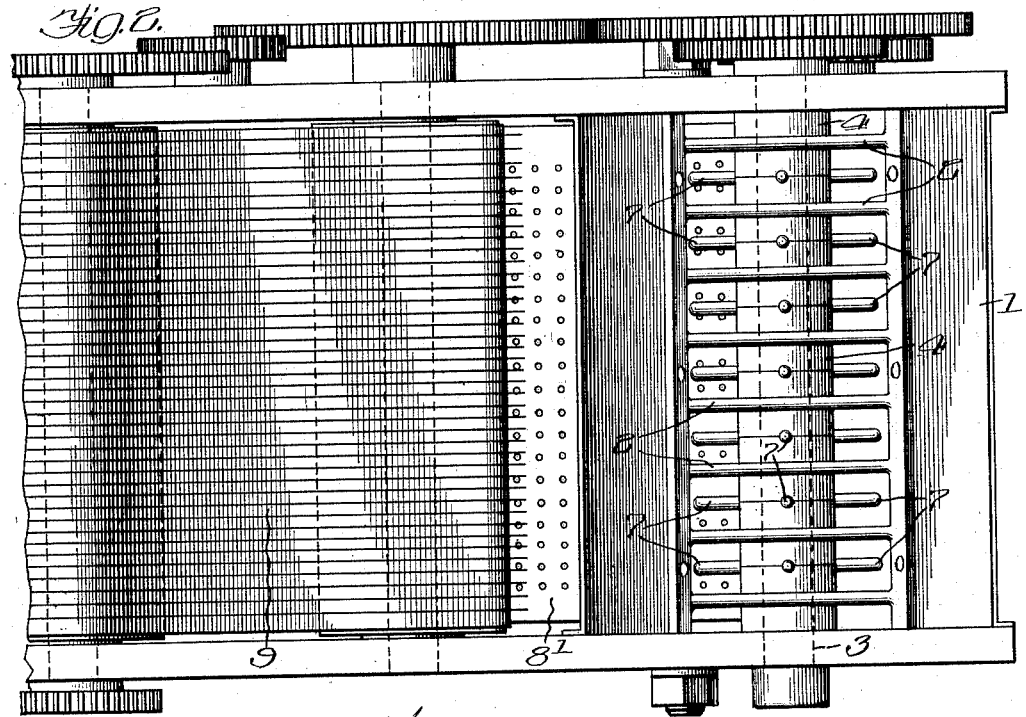
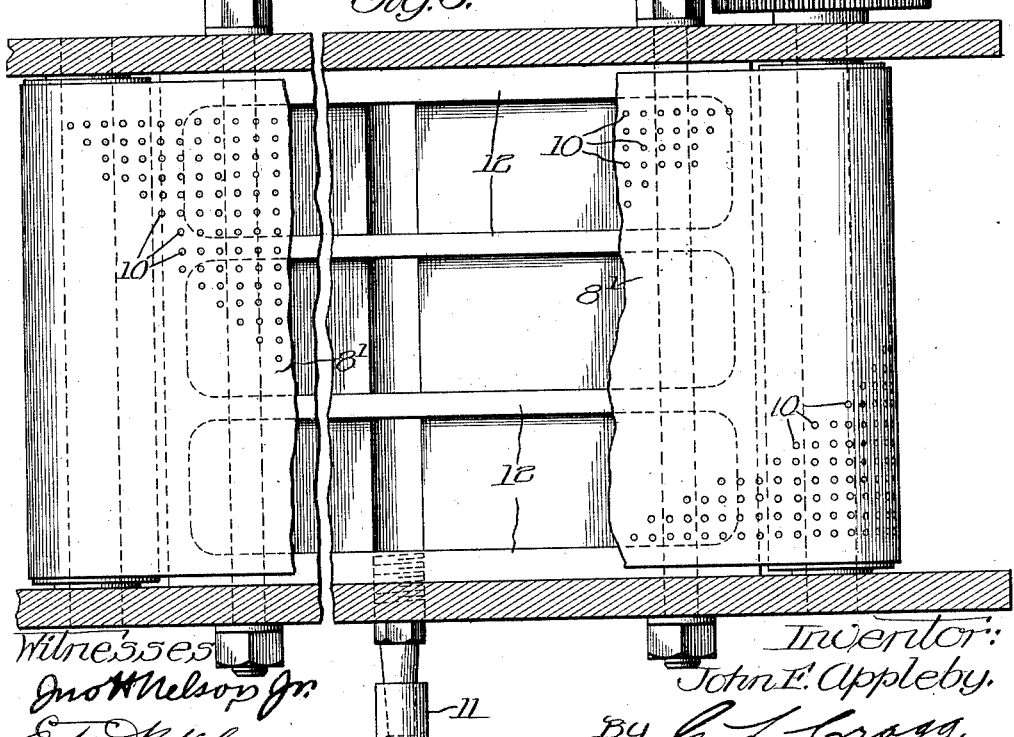

J. F. APPLEBY.
COTTON CLEANER.
APPLICATION FILED NOV. 17, 1911.
1,076,939.
Patented Oct. 28, 1913.
3 SHEETS—SHEET 3.
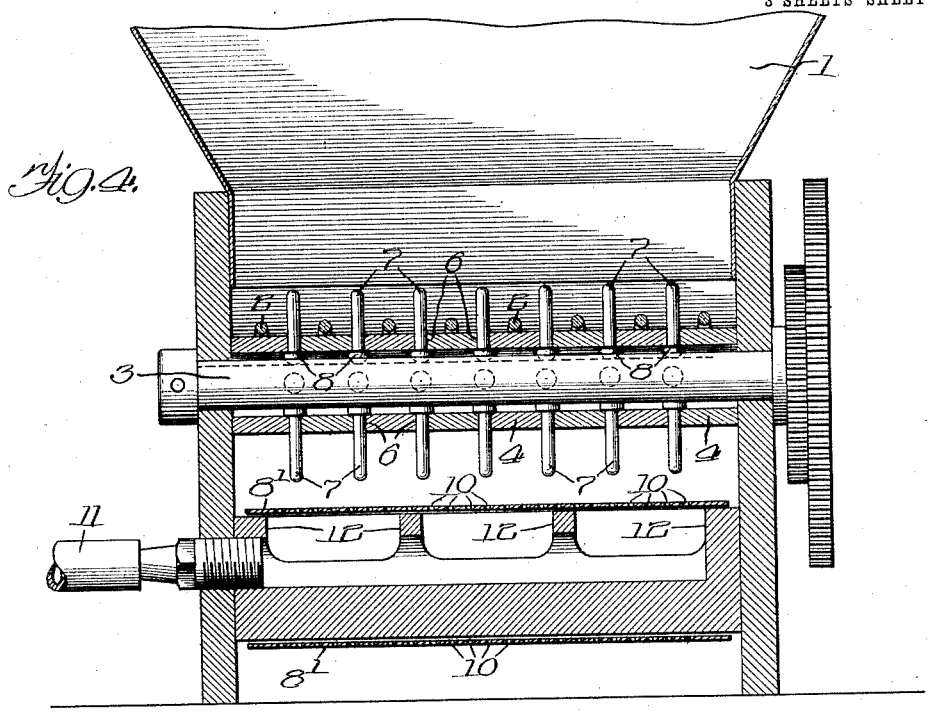
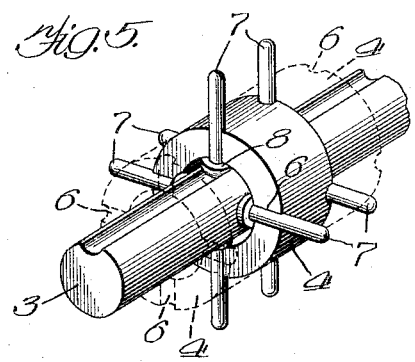
Witnesses:
Jno. H. Nelson Jr.
Edwin B. Nelson
Inventor:
John F. Appleby.
By G. L. Cragg
Atty.

UNITED STATES PATENT OFFICE.

JOHN F. APPLEBY, OF DAVENPORT, IOWA, ASSIGNOR TO WESTERN IMPLEMENT & MOTOR COMPANY, OF DAVENPORT, IOWA, A CORPORATION OF DELAWARE.

COTTON-CLEANER.

1,076,939.  Specification of Letters Patent.  Patented Oct. 28, 1913.

Application filed November 17, 1911. Serial No. 660,852.

*To all whom it may concern:*

Be it known that I, JOHN F. APPLEBY, citizen of the United States, residing at Davenport, in the county of Scott and State of Iowa, have invented a certain new and useful Improvement in Cotton-Cleaners, of which the following is a full, clear, concise, and exact description, reference being had to the accompanying drawings, forming a part of this specification.

My invention relates to cotton cleaners and has for its object the provision of mechanism for treating the cotton as it comes from the field and separating foreign material therefrom so that the cotton may be cleaned preparatory to the ginning process.

The machine of my invention includes a passage way, two of whose opposite walls converge toward the exit of the passage way, the cotton to be cleaned being fed into the tapered cotton receiving passage way at its wider end and encountering moving cleaning devices projecting from one of the converging walls of the passage way and which operate upon the cotton deposited into the passage to remove the tufts of cotton with the seed clinging thereto and permitting the leaves and other coarse foreign matter to become separated from the cotton. These cleaning devices are desirably in the form of short and sharp wire teeth which are preferably caused to travel in a direction opposite to that in which the material operated upon is being passed. These teeth project from one of the aforesaid walls of the passage and, in the preferred embodiment of the invention, the wall from which these teeth project is in the form of a stretch of a belt carrying the teeth. The belt, which is thus in the nature of a carding belt, is endless and is caused to travel so as to carry the teeth bodily through the passage way in the general direction which has been described, the carding teeth thus being constantly replaced in the passage way by other carding teeth so that the cotton abstracted thereby may be carried from the passage way and fresh cotton abstracting teeth may replace the loaded teeth. In the preferred embodiment of the invention the wall of the passage way opposite to the wall from which the carding teeth project also travels, but in an opposite direction to that in which the carding teeth travel so that the coarser material may be passed from the passage way. I do not wish to be limited, however, to the movement of the wall which is opposite the wall that is provided with the carding teeth.

I will explain my invention more fully by reference to the accompanying drawing showing the preferred embodiment thereof and in which—

Figure 1 is a view in sectional elevation of a machine constructed in accordance with one embodiment of the invention; Fig. 2 is a plan view of a portion of the machine illustrated in Fig. 1; Fig. 3 is a sectional view on line 3 3 of Fig. 1; Fig. 4 is a sectional view on line 4 4 of Fig. 1; and Fig. 5 is a perspective view of a portion of the mechanism entering into my improved structure.

Like parts are indicated by similar characters of reference throughout the different figures.

The structure, as I have preferably embodied it, includes a hopper 1 into which the cotton, as it is gathered from the field, is discharged in any suitable way. The bottom of this hopper is in the form of grate bars 2 between which comparatively wide spaces intervene and below which a roller 3 is mounted to rotate in a clockwise direction as illustrated in Fig. 1. This roller is composed of two sections, one enveloping the other, the inner section being in the form of a shaft while the outer section is formed of a plurality of rings 4 as illustrated most clearly in Fig. 5, the adjacent faces of adjacent rings being provided with teeth receiving recesses 6. Teeth 7 are disposed within the recesses 6, these teeth being provided with inner heads 8 that are disposed as illustrated in Figs. 4 and 5. The free ends of the teeth are successively passed through the grate bar spaces and engage the cotton in the hopper and draw it through the grate bar spaces whereby the mass of cotton is sufficiently redistributed to enable the cotton to be moved toward the narrower end of the passage in which the carding teeth, to be described, have action upon the cotton for the purpose of abstracting the cotton tufts from the mass of cotton and foreign material. The grate bars 2 are desirably formed at their left hand ends as illustrated in Fig. 1 to prevent the revolving teeth from carrying any cotton back to the hopper, the left hand ends of these bars 2 closely approaching the cylinder from which the teeth project and operating to strip cotton from the cylinder that may otherwise cling thereto.

In the preferred embodiment of the invention the cotton is deposited upon a traveling belt $8^1$ driven in any suitable way. The upper stretch of this traveling belt constitutes the lower wall of the passage way which has been heretofore mentioned, when such passage way is substantially horizontally disposed but to which disposition of the passage way I do not wish to be limited. The upper stretch of this traveling belt $8^1$ transfers the cotton to be passed beneath a carding belt 9 that slopes upwardly toward the hopper and converges toward the upper stretch of the belt $8^1$ at the left. The elements $8^1$ and 9, where they oppose each other, constitute opposite walls of a passage way through which the cotton, that is to be cleaned, is passed. The carding belt 9 travels in a direction opposite to that in which the conveyer belt $8^1$ travels and the teeth of the carding belt gradually approach the belt $8^1$ toward the discharge end of the passage way in which the cotton undergoing the cleaning process is passed. The teeth of the carding belt that first encounter the cotton abstract the uppermost tufts of cotton, the succeeding teeth gradually abstracting the tufts of cotton that lie closer to the belt $8^1$, the teeth of the carding belt being of such a nature as to enable the cotton tufts to adhere thereto while permitting the leaves and other foreign matter to fall away, this result being promoted owing to the fact that the heavier foreign material travels in one direction while the removed cotton tufts travel in the reverse direction. The removal of the leaves and other foreign matter is promoted by air suction which causes them to adhere closely to the upper stretch of the belt so that this belt stretch may readily discharge the same from the passage way in which the cleaning operation has occurred. To this end the upper stretch of the belt desirably rides over a cavity that is closed except at the top, and which is partially closed at the top by a belt which is provided with apertures 10 therethrough for the purpose of permitting air to be sucked downwardly. A suction pipe 11 communicates with the space below the upper stretch of the belt and serves to draw the air through the apertures 10. To hold the upper belt stretch in its proper level a number of ribs 12 are disposed longitudinally beneath and in contact with the under surface of the upper belt stretch. The cotton that has been removed by the carding belt 9 is carried toward the right and then upwardly on the upper inclined stretch of the belt to the brush cylinder 13 whose bristles serve to brush the cotton from the carding teeth of the carding belt, the brush 13 serving to discharge the removed cotton upon a conveyer belt 14 that may be driven in any suitable way.

While I have herein shown and particularly described the preferred embodiment of my invention, I do not wish to be limited to the precise details of construction shown as changes may readily be made without departing from the spirit of my invention.

Having thus described my invention, I claim as new and desire to secure by Letters Patent the following:—

1. A cotton cleaner having a tapering cotton receiving passage; a belt carrying teeth projecting into the passage and mounted to present a stretch to the opposite side of the passage that slopes away from this opposite side of the passage from the narrower to the broader end of the passage whereby the proximity of the teeth with respect to the side of the passage opposite the same increases toward the narrower end of the passage; means for effecting the travel of the belt to cause the teeth to move while within the passage from the narrower to the broader end of the passage; and a conveyer belt having a stretch which defines the side of the passage opposite said teeth, there being means whereby this stretch of the belt is moved from the broader toward the narrower end of the passage.

2. A cotton cleaner having a tapering cotton receiving passage provided with teeth projecting into the passage; means for effecting the travel of said teeth while projecting in said passage from the narrower end toward the broader end of said passage, the teeth having a mounting serving to cause the proximity of the teeth with respect to the opposite side of the passage to increase toward the narrower end of said passage; and a conveyer belt having a stretch which defines the side of the passage opposite said teeth, there being means whereby this stretch of the belt is moved from the broader toward the narrower end of the passage.

In witness whereof, I hereunto subscribe my name this tenth day of November A. D., 1911.

JOHN F. APPLEBY.

Witnesses:
H. S. MURPHY,
J. E. BURMEISTER.